United States Patent
Wessels

(10) Patent No.: US 9,461,572 B2
(45) Date of Patent: Oct. 4, 2016

(54) METHOD FOR CONTROLLING A WIND TURBINE DURING AN ASYMMETRICAL GRID FAULT AND A WIND TURBINE

(71) Applicant: Nordex Energy GmbH, Hamburg (DE)

(72) Inventor: Christian Wessels, Hamburg (DE)

(73) Assignee: Nordex Energy GmbH, Hamburg (DE)

( * ) Notice: Subject to any disclaimer, the term of this patent is extended or adjusted under 35 U.S.C. 154(b) by 0 days.

(21) Appl. No.: 14/720,510

(22) Filed: May 22, 2015

(65) Prior Publication Data
US 2015/0365031 A1     Dec. 17, 2015

(30) Foreign Application Priority Data

Jun. 13, 2014   (EP) ..................... 14172445

(51) Int. Cl.
| | |
|---|---|
| *F03D 9/00* | (2016.01) |
| *H02P 9/04* | (2006.01) |
| *H02P 9/00* | (2006.01) |
| *H02J 3/18* | (2006.01) |
| *H02P 101/15* | (2015.01) |

(52) U.S. Cl.
CPC ................ *H02P 9/007* (2013.01); *H02J 3/18* (2013.01); *H02J 3/1885* (2013.01); *H02P 23/26* (2016.02); *F03D 9/00* (2013.01); *H02P 2101/15* (2015.01); *Y02E 10/763* (2013.01); *Y02E 40/30* (2013.01)

(58) Field of Classification Search
USPC ...................................................... 290/44, 55
See application file for complete search history.

(56) References Cited

U.S. PATENT DOCUMENTS

| | | | | |
|---|---|---|---|---|
| 3,644,788 A | * | 2/1972 | Maenicke | H02H 3/382 361/80 |
| 4,163,270 A | * | 7/1979 | Marus | H02H 11/004 318/289 |

(Continued)

OTHER PUBLICATIONS

Xu, L., "Coordinated Control of DFIG's Rotor and Grid Side Converters During Network Unbalance", IEEE Transactions on Power Electronics, vol. 23, No. 3, May 2008, pp. 1041 to 1049.

(Continued)

*Primary Examiner* — Pedro J Cuevas
(74) *Attorney, Agent, or Firm* — Walter Ottesen, P.A.

(57) ABSTRACT

The invention is directed to a method for controlling a wind turbine connected to a three-phase electrical supply grid during an asymmetrical grid fault. The method is configured for wind turbines with a doubly-fed induction generator. The reactive current to be fed into the electrical supply grid in the negative phase-sequence system is generated by the line-side and the rotor-side converter in a coordinated manner and depends on the line voltage. The reactive current to be fed into the electrical supply grid is distributed among the rotor-side and line-side converters. As a result, even in the case of severely asymmetrical grid faults, the reactive current to be fed into the electrical supply grid can be provided and excessive loading of the rotor-side converter can be prevented using simple means. The invention is also directed to a wind turbine for performing the above method.

14 Claims, 2 Drawing Sheets

(56) References Cited

U.S. PATENT DOCUMENTS

| | | | | |
|---|---|---|---|---|
| 4,511,807 A * | 4/1985 | Somerville | | F03D 9/003 290/42 |
| 4,724,503 A * | 2/1988 | Libert | | H02H 7/097 318/798 |
| 6,566,764 B2 * | 5/2003 | Rebsdorf | | F03D 9/003 290/44 |
| 6,856,038 B2 * | 2/2005 | Rebsdorf | | F03D 9/003 290/44 |
| 7,180,206 B2 * | 2/2007 | Haugs | | G05F 1/38 307/102 |
| 7,423,412 B2 | 9/2008 | Weng et al. | | |
| 7,839,008 B2 | 11/2010 | Woldmann et al. | | |
| 7,948,102 B2 | 5/2011 | Schubert et al. | | |
| 8,390,138 B2 | 3/2013 | Fortmann et al. | | |
| 8,390,139 B2 | 3/2013 | Fortmann | | |
| 8,400,003 B2 | 3/2013 | Letas et al. | | |
| 8,558,405 B2 * | 10/2013 | Brogan | | H02J 3/386 290/55 |
| 8,692,399 B2 | 4/2014 | Schubert et al. | | |
| 8,698,334 B2 * | 4/2014 | Bo | | H02J 3/1878 290/44 |
| 8,698,461 B2 | 4/2014 | Engelhardt et al. | | |
| 8,880,228 B2 * | 11/2014 | Kumar | | H02J 3/26 290/44 |
| 8,994,202 B2 * | 3/2015 | Gupta | | F03D 9/003 290/44 |
| 9,035,480 B2 * | 5/2015 | Fortmann | | H02J 3/26 290/44 |
| 2002/0079706 A1 * | 6/2002 | Rebsdorf | | F03D 9/003 290/55 |
| 2004/0026929 A1 * | 2/2004 | Rebsdorf | | F03D 9/003 290/44 |
| 2004/0184212 A1 * | 9/2004 | Haugs | | G05F 1/38 361/118 |
| 2010/0039737 A1 * | 2/2010 | Koshizuka | | H02H 9/002 361/36 |
| 2010/0264666 A1 * | 10/2010 | Bo | | H02J 3/1878 290/55 |
| 2013/0241201 A1 * | 9/2013 | Fortmann | | H02J 3/26 290/44 |
| 2014/0001759 A1 * | 1/2014 | Gupta | | F03D 9/003 290/44 |
| 2014/0008912 A1 * | 1/2014 | Gupta | | H02J 3/386 290/44 |
| 2014/0015250 A1 * | 1/2014 | Teodorescu | | F03D 7/0284 290/44 |
| 2014/0103886 A1 | 4/2014 | Heier et al. | | |
| 2015/0137520 A1 * | 5/2015 | Garcia | | H02J 3/1885 290/44 |

OTHER PUBLICATIONS

VDE-AR-N 4120, "Technical requirements high voltage", Jan. 1, 2015, VDE Association for Electrical, Electronics & Information Technologies, 127 pages. Abstract in English.

* cited by examiner

METHOD FOR CONTROLLING A WIND TURBINE DURING AN ASYMMETRICAL GRID FAULT AND A WIND TURBINE

CROSS REFERENCE TO RELATED APPLICATION

This application claims priority of European patent application no. 14172445.0, filed Jun. 13, 2014, the entire content of which is incorporated herein by reference.

FIELD OF THE INVENTION

The present invention relates to a method for controlling a wind turbine connected to a three-phase electrical supply grid during an asymmetrical grid fault. Likewise, the present invention relates to a wind turbine configured for performing the method. In particular, the method is configured for wind turbines having a doubly-fed induction generator.

BACKGROUND OF THE INVENTION

Such an asymmetrical grid fault is present when at least the amplitude of an electrical variable in one phase of the grid deviates from the nominal value. The cause of an asymmetrical grid fault may be, for example, a short circuit in the corresponding phase. In accordance with the method of symmetrical components, an asymmetrical grid fault is defined by the occurrence of components differing from zero in the negative phase-sequence system. In the method of symmetrical components, a three-phase system is transformed into a two-phase system, wherein a first phasor corresponds to the positive phase-sequence system and a second phasor corresponds to the negative phase-sequence system. The phasors contain the active and reactive power components of the respective system in their real and imaginary parts. The components thus constitute a measure for the asymmetry of a grid fault and enable classification of such faults and therefore fault clearance.

E VDE-AR-N 4120, Draft, November 2012 entitled "Technische Bedingungen für den Anschluss and Betrieb von Kundenanlagen an das Hochspannungsnetz (TAB Hochspannung)" {Technical requirements for the connection and operation of customer installations to the high voltage networks (TAB high voltage) http://www.vde.com/en/dke/std/VDEapplicationguides/Publications/Pages/VDE-AR-N4120.aspx} discloses a voltage support in the case of grid faults via a reactive current feed-in. Chapter 10.2.3.2 explains that, in the event of the occurrence of sudden voltage deviations of $\Delta U \geq \pm 2.5\%$ $U_{nominal}$, generating units are required to support the voltage of the high-voltage grid by matching (increasing or decreasing) the reactive current $I_B$ fed into the grid by providing an additional reactive current $\Delta I_B$. For $\Delta U < \pm 2.5\%$ $U_{nominal}$, the requirements for steady-state voltage stability apply. More detailed explanations are provided with respect to the fact that the distribution of the reactive current deviation $\Delta I_B$ to a positive phase-sequence system and a negative phase-sequence system ($\Delta i_{B1}$, and $\Delta i_{B2}$) would have to take place corresponding to the change in voltage in the positive phase-sequence system and in the negative phase-sequence system, respectively.

U.S. Pat. No. 8,390,138 discloses a wind turbine whose line-side converter comprises a negative phase-sequence system control system including a phase control module. The phase control module is configured to determine an electrical variable of the negative phase-sequence system in a phase-specific manner. Thus, the available current can be preset depending on the operating condition for active power or reactive power in the negative phase-sequence system. Phase control can be used for stabilization of the grid in particular in the case of asymmetrical grid conditions.

U.S. Pat. Nos. 8,390,139 and 8,400,003 disclose a method for controlling a converter of a wind turbine having a doubly-fed induction generator. The wind turbine comprises a generator-side and a line-side converter. A change in the reactive current output of one converter is detected and, in the event of a deviation from a setpoint value, the setpoint value for the reactive current to be output by the respective other converter is changed. The control of the two converters is matched to one another in such a manner that the total current output is optimized.

Lie, Xu: "Coordinated Control of DFIG's Rotor and Grid Side Converters During Network Unbalance", IEEE Transactions on Power Electronics, vol. 23, no. 3, May 2008 discloses a method for controlling an electrical generating system having a doubly-fed induction generator in the case of the occurrence of an asymmetrical line voltage. The rotor-side converter is controlled in such a manner that torque variations are suppressed. Fluctuations in the stator active power output into the grid are compensated by control of the active power output of the line-side converter, resulting in the generating system feeding a constant active power into the grid. The control method is based on a mutually dependent control of the currents in the positive phase-sequence system and the negative phase-sequence system of the rotor-side and the line-side converter.

SUMMARY OF THE INVENTION

It is an object of the present invention to provide a method for controlling a wind turbine comprising a doubly-fed induction generator and which is connected to an electrical supply grid during an asymmetrical grid fault, enabling grid support by providing reactive current in a simple and reliable manner. It is furthermore the objective of the present invention to provide a wind turbine which is configured to perform the method.

The method according to the invention relates to the control of a wind turbine connected to a three-phase electrical supply grid during an asymmetrical grid fault. The method is intended for a wind turbine comprising a doubly-fed induction generator, whose rotor is connected to the electrical supply grid via a converter system, which comprises a rotor-side AC/DC converter, a line-side DC/AC converter and a DC link therebetween, wherein the stator of the generator is connected to the electrical supply grid. The method is furthermore intended for a wind turbine whose AC/AC converter includes a controller, in which a characteristic is provided which specifies a setpoint value for a reactive current to be fed-in in a negative phase-sequence system in dependence of an actual value of a line voltage in the negative phase-sequence system. In addition, the term "rotor-side converter" is used in lieu of "rotor-side AC/DC converter" and the term "line-side converter" is used in lieu of "line-side AC/DC converter.

The method according to the invention comprises the following steps:

measuring the actual values of the line voltage in at least two phases, transforming the measured actual values of the line voltage into an actual value of the line voltage in the negative phase-sequence system, determining a setpoint value for a reactive current to be fed into the electrical supply grid in the negative phase-sequence system on the basis of the provided characteristic and the actual value of the line voltage in the negative phase-sequence system.

In a preferred embodiment of the invention, the method further comprises the steps of:

distributing the determined setpoint value for the reactive current to be fed into the electrical supply grid to the rotor-side and the line-side converter by generating a setpoint value for a reactive current component to be provided by the rotor-side converter and by determining a setpoint value for a reactive current component to be provided by the line-side converter in accordance with a distribution rule provided in the controller, and controlling the rotor-side converter and the line-side converter reactive current feed corresponding to the distributed setpoint values by the controller.

In the method according to the preferred embodiment of the invention, the reactive current to be fed-in in the negative phase-sequence system is generated depending on the line voltage by the line-side and the rotor-side converter in a coordinated manner. Furthermore, according to the preferred embodiment of the invention, the reactive current to be fed into the electrical supply grid is distributed among the rotor-side and line-side converters. As a result, even in the case of severely asymmetrical grid faults, the reactive current to be provided can be fed-in and excessive loading of the rotor-side converter can be prevented using simple means.

With this approach, the line-side converter is used to influence the line voltage by providing a reactive current and to relieve the load on the rotor-side converter. In the prior art, the line-side converter and the reactive current feed-in thereof have always been used to smooth oscillations in the power output. According to the present invention, however, the line-side converter is used specifically for meeting the requirements for feeding in a reactive current in the negative phase-sequence system in the case of the presence of an asymmetrical grid fault. The characteristic is preset for the method in such a way that there is a response to an asymmetrical grid fault by a feed-in of reactive current in the negative phase-sequence system which is characterized by the actual value of the line voltage in the negative phase-sequence system.

In a further preferred method according to the invention, the distribution rule ensures that the setpoint value for the reactive current component to be provided by the rotor-side converter is limited by a predefined maximum value. If the setpoint value for the reactive current to be fed into the electrical supply grid in the negative phase-sequence system exceeds the predefined maximum value for the rotor-side converter, the setpoint value for the reactive current component to be provided by the rotor-side converter is increased at most up to the maximum value. The setpoint value for the reactive current to be fed into the electrical supply grid in the negative phase-sequence system is reached by determining the difference between the setpoint value for the reactive power to be provided in the negative phase-sequence system and the setpoint value for the reactive current component to be provided by the rotor-side converter as the setpoint value for the reactive current component to be provided by the line-side converter and controlling the line-side converter according to the setpoint value. With this distribution of the setpoint values among the line-side and the rotor-side converter, the rotor-side converter is operated at most close to the predefined maximum value. The predefined maximum value for the reactive current component to be provided by the rotor-side converter can be selected such that, when the reactive current component provided by the rotor-side converter reaches the predefined maximum value, a limit value for an electrical rotor variable is not exceeded. Depending on the selected controller structure and the temporal characteristics of the grid fault it is permissible for the maximum value to be exceeded slightly and for a short period of time.

In a further preferred embodiment of the method according to the invention, the distribution rule provides for that in the case that the setpoint value for the reactive current to be fed into the electrical supply grid in the negative phase-sequence system is lower than the maximum value for the reactive current component to be provided by the rotor-side converter the setpoint value for the reactive current component to be provided by the line-side converter is determined such that the determined setpoint value for the line-side converter is small in comparison to the setpoint value for the reactive current component to be provided by the rotor-side converter and the remaining component for the reactive current to be fed in in the negative phase-sequence system is assigned to the rotor-side converter, with the result that, overall, a reactive current corresponding to the setpoint value from the preset reactive current-voltage-characteristic is fed into the electrical supply grid. The reactive current setpoint value for the line-side converter can be, for example, less than one to less than 10 percent of the reactive current setpoint value for the rotor-side converter.

In a further preferred embodiment of the method according to the invention, the distribution rule provides for an actual value of the electrical rotor variable to be detected and to be compared with a predefined threshold value for the electrical rotor variable. If the comparison determines, that the actual value of the electrical rotor variable is less than or equal to the predefined threshold value for the electrical rotor variable, the distribution of the setpoint value for the reactive current to be fed into the electrical supply grid in the negative phase-sequence system is performed such that either only reactive power is provided by the rotor-side converter or to a small extent also by the line-side converter. If, during the comparison, it is determined that the actual value of the electrical rotor variable is greater than the predefined threshold value for the electrical rotor variable, a distribution of the setpoint value for the reactive current to be fed into the electrical supply grid in the negative phase-sequence system is performed to the extent that the setpoint value of the reactive current component to be provided by the line-side converter is increased in order to make a contribution at all or to increase its contribution to the reactive current to be generated. In this embodiment, therefore, overloading of the rotor-side converter is avoided using the measured electrical rotor variable by virtue of the setpoint value of the reactive current component of the rotor-side converter to be provided in the negative phase-sequence system being determined depending on the measured electrical rotor variable and the predefined threshold value for the electrical rotor variable and being used for the control of the system of the rotor-side and line-side converters. Above the predefined threshold value for the electrical rotor variable the setpoint value for the reactive current component to be provided by the rotor-side converter is increased to a lesser extent than below the predefined threshold value, while the setpoint value of the reactive current component of the line-side converter to be provided is increased such that the sum of the two setpoint values corresponds to the setpoint value for the reactive current to be fed into the electrical supply grid in the negative phase-sequence system. Corresponding to one of the above-explained configurations, provision is also made in this distribution rule for the setpoint value for the reactive current component to be provided by the rotor-side converter so as to limit the setpoint by a predefined maximum value. If the reactive current component to be provided by the rotor-side converter reaches the predefined maximum value, the setpoint is not increased beyond the predefined maximum value. In the case of an additional line-side demand for reactive power, additional reactive power is provided via the line-side converter. The setpoint value of the reactive current component of the rotor-side converter to be provided can therefore be limited to a maximum value, while the loading on the rotor-side converter can be reduced above the threshold value.

In a further preferred embodiment of the method according to the invention, the distribution rule provides for the distribution of the setpoint value for the reactive current to be fed into the electrical supply grid in the negative phase-sequence system into the setpoint value components for the rotor-side and the line-side converter to be performed on the basis of a preset distribution rule, such as a mathematical function or a comparable specification. For example, a setpoint value function $\hat{I}_{rotor}(x)$ can be preset for the rotor-side reactive current component, wherein x is the monitored electrical rotor variable. The setpoint value $\hat{I}_{grid}(x)$ for the reactive current component to be provided by the line-side converter can thus be determined depending on the monitored electrical rotor variable and the setpoint value for the reactive current to be fed into the electrical supply grid in the negative phase-sequence system $\hat{I}_{total}$ as the difference $\hat{I}_{grid}(x) = \hat{I}_{total} - \hat{I}_{rotor}(x)$. The setpoint value function $\hat{I}_{rotor}(x)$ can be selected such that $\hat{I}_{rotor}(x)$ initially increases disproportionately in relation to $\hat{I}_{grid}(x)$ as x increases (see FIG. 2, profile 203) and passes into an asymptotic profile with which the function $\hat{I}_{rotor}(x)$ comes close to the maximum value for the rotor-side reactive current component as x increases. Preferably, the distribution rule is selected in such a manner such that the setpoint value component for the rotor-side converter asymptotically approaches the maximum value as the electrical rotor variable increases.

According to another feature of the invention, the distribution rule is configured to asymptotically drive the setpoint value component for the rotor-side converter toward the maximum value depending on the electric rotor variable.

In principle, when using such setpoint value functions, further monitored characteristic variables or states of the rotor-side converter can be taken into consideration as parameters. As an alternative to the use of a mathematical function, a set of characteristic curves can be specified as distribution rule (for example represented as a look-up table). The set of characteristic curves can include, for example, setpoint values for the reactive current components to be provided by the rotor-side and the line-side converter depending on the setpoint value of the reactive current in the negative phase-sequence system. The stored curves in this case need to be selected in such a way that it is ensured that the maximum of the electrical rotor variable is not exceeded and the setpoint value for the reactive current to be fed into the electrical supply grid in the negative phase-sequence system is reached. The set of characteristic curves can be established, on the basis of measurement data determined in a test.

When determining the reactive current setpoint value for the rotor-side converter, it is taken into consideration that the reactive current which can be influenced on the rotor side is exchanged between the stator of the generator and the electrical supply grid. Accordingly, the reactive current setpoint value for the rotor-side converter is calculated taking into consideration the transformation ratio, the phase angle and slip of the rotor of the generator. The conversion of stator variables into rotor variables is known from the prior art and is therefore not specified in more detail. The variables required for the conversion, such as the speed of the rotor of the generator or the line frequency, are measured and provided to the controller as input variables. Other parameters such as the main and leakage inductance are stored in the controller as parameters and are therefore available for the conversion.

The determined reactive current setpoint values for the rotor-side and the line-side converter and the corresponding actual values are provided to respective current controllers as input variables, which are configured to provide setpoint values for a modulation on the basis of these variables. Possible modulation methods are, for example, pulse width modulation or space vector modulation.

In a preferred embodiment, the electrical rotor variable is a rotor current. Alternatively, a rotor voltage can also be provided as electrical rotor variable. The corresponding rotor circuit variables are detected and are provided to the controller as input variables. In particular peak values or rms values of the rotor current or the rotor voltage are suitable for monitoring. In a preferred embodiment, the monitored electrical rotor variable of the rotor-side converter is transformed into the symmetrical representation for the control step. Threshold values and/or maximum values for the electrical rotor variable or the setpoint value for the reactive current component to be provided by the rotor-side converter can be determined, for example, on the basis of data determined in a test and stored in the controller.

The object according to the invention is likewise achieved by a wind turbine provided for feeding electricity into a three-phase electrical supply grid. The wind turbine according to the invention comprises a doubly-fed induction generator, whose rotor is connected to the electrical supply grid via a converter system and whose stator is connected to the electrical supply grid. The converter system comprises a rotor-side converter and a line-side converter. In addition, the converter system comprises a controller, in which a characteristic is provided which, for an actual value of a line voltage in a negative phase-sequence system, specifies a setpoint value for a reactive current to be fed into the electrical supply grid in the negative phase-sequence system. The wind turbine according to the invention comprises a measurement device, which is configured to detect actual values of the line voltage of at least two phases of the electrical supply grid and to provide the actual values to the controller as input variables. The controller comprises a transformation module, which is configured to transform the measured actual values of the line voltage into actual values of the line voltage in the negative phase-sequence system. Furthermore, the controller is configured to determine a setpoint value for a reactive current to be fed into the electrical supply grid in the negative phase-sequence system on the basis of the characteristic in response to the actual value of the line voltage in the negative phase-sequence system. The controller according to the invention also comprises a setpoint value module, which is configured to determine a setpoint value for the reactive current component to be provided by the rotor-side converter and a setpoint value for the reactive current component to be provided by the line-side converter in response to the setpoint value of the reactive current to be fed in in the negative phase-sequence system depending on a distribution rule provided in the controller. Furthermore, the controller according to the invention comprises current controllers for the rotor-side and the line-side converter which are provided with the respective setpoint values for the reactive power component to be fed into the electrical supply grid and which are configured to actuate the rotor-side and the line-side converter so as to provide a corresponding reactive current. Preferably, the wind turbine according to the invention is configured for operation in accordance with the method according to the invention.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
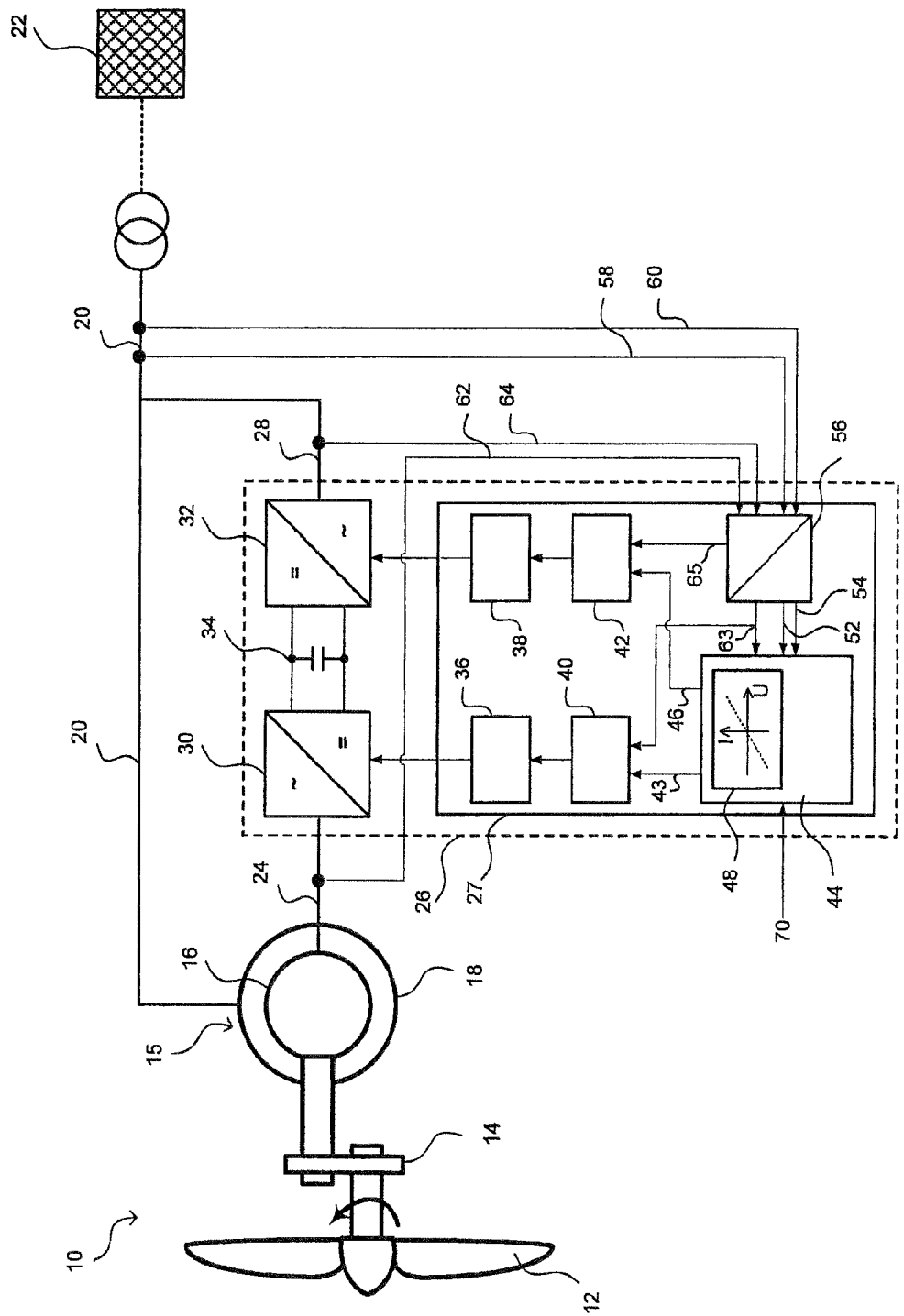
FIG. 1 shows a schematic of a wind turbine.

FIG. 1 shows a schematic view of a wind turbine 10, whose rotor 12 takes up a torque from the wind and transfers it to the rotor of the generator 16 of a doubly-fed induction generator 15 via a drive train 14, which includes a transmission; the induction generator is configured to convert the kinetic energy into electrical energy and to feed it into a three-phase electrical supply grid 22. The stator of the generator 18 is connected to the three-phase electrical supply grid 22 via a three-phase line 20. The rotor of the generator 16 is connected to a converter system 26 via a three-phase line 24. The converter system 26 is connected on the grid side to the stator lines 20 and the electrical supply grid 22 via a three-phase line 28. For the purpose of clarity, electrical lines are schematically illustrated in single-phase form in the figure.

The converter system 26 has a rotor-side converter 30 and a line-side converter 32. A DC link 34 is provided between the converters. The converter system 26 furthermore has a controller 27, which is configured to control the operation of the converters 30, 32 depending on input variables 58, 60, 62, 64, 70 present at the controller 27 and parameters and/or distribution rules stored in a memory device (not shown) of the controller 27. The controller 27 is configured to execute control software stored in the controller 27 in order to implement the method according to the invention. In order to illustrate the method steps which are relevant to the invention, individual essential elements used in the control method are shown in FIG. 1. The individual elements can be interpreted either as software modules of the control software or as separate apparatuses which are configured to implement a specific method step of the control method.

A controller via which the operation of the wind turbine is controlled is not shown for improved clarity. However, it is conceivable for parts of the method according to the invention to be realized in such a controller and for the controller to determine, for example, a setpoint value for a reactive power to be provided in the negative phase-sequence system depending on the line voltage and for this setpoint value to be preset to the controller 27 of the converter system 26 by such a wind turbine controller.

The converters 30, 32 are controlled via current controllers 40, 42, wherein the setpoint values determined by the current controllers 40, 42 are modulated in subsequent steps 36 and 38, respectively, via pulse width modulation, for example. Setpoint values 43 and 46 and actual values 63 and 65 for the control of the rotor-side converter 30 and of the line-side converter 32, respectively, are present at the current controllers 40, 42 wherein the setpoint values 43, 46 are provided by a setpoint value module 44.

The voltages 58 and currents 60 measured on the line side are present as input variables at the controller 27. Furthermore, the currents measured in the three-phase line 24 between the rotor of the generator 16 and the rotor-side converter 30 (in short: currents measured on the input side) 62 and the currents measured in the three-phase line 28 on the output side of the line-side converter 32 (in short: currents measured on the output side) 64 are also present as input variables at the converter controller 27. The plural form used in the description is due to the phase-dependent measurement and processing of the input variables. The term voltages measured on the line side 58 should therefore be understood as meaning that, for example, information relating to the value of the voltages of all three phases of the three-phase system is present at the controller 27 with the input variables. Alternatively, for three-phase systems without a PEN conductor, the third phase can be calculated from information relating to the voltages of the other two phases, with the result that only two measured values are present at the controller 27 with the voltages 58 measured on the line side and the converter controller 27 calculates the voltage on the remaining phase. The input variables 58, 60, 62, 64 present at the controller 27 are measured by suitable measurement devices, which detect the variables on the electrical lines 20, 24, 28 and communicate these variables to the controller 27 as input variables. Contactless sensors, for example, can be used as measuring devices, shown schematically as dots in FIG. 1.

The controller 27 has a transformation module 56, which is configured to mathematically transform the input variables 58, 60, 62, 64, voltages and currents of the individual phases into corresponding symmetrical components, that is voltages and currents in the positive phase-sequence system and in the negative phase-sequence system. For this purpose the voltages 58 measured on the line side, the currents 60 measured on the line side and the currents 62 measured on the input side and the currents 64 measured on the output side are present at the transformation module 56 as input variables. The transformation module 56 calculates the corresponding actual value of the line side voltage in the negative phase-sequence system 52 from the voltages 58 measured on the line side, the corresponding actual value of the line side current in the negative phase-sequence system 54 from the currents 60 measured on the line side, and the actual values of the input side currents in the positive phase-sequence system and negative phase-sequence system 63 from the currents 62 measured on the input side and the actual values of the output side currents in the positive phase-sequence system and negative phase-sequence system 65 from the currents 64 measured on the output side in accordance with a mathematical specification stored in the transformation module 56. The actual value of the line side voltage in the negative phase-sequence system 52 and the actual value of the line side current in the negative phase-sequence system 54 are transmitted from the transformation module 56 to the setpoint value module 44 for processing. It should be noted that the actual value of the line side current in the negative phase-sequence system 54 can have a reactive current component in addition to an active current component. In the exemplary embodiment described here, the actual values of the input side currents in the positive phase-sequence system and negative phase-sequence system 63 and the actual values of the output side currents in the positive phase-sequence system and negative phase-sequence system 65 are transmitted to the current controllers 40 and 42, respectively, for processing. Furthermore, the actual values 63 are transmitted to the setpoint value module 44 for processing.

A characteristic 48 via which setpoint values for a reactive current to be provided into the electrical supply grid in the negative phase-sequence system are assigned to actual values of the line side voltage is preset in the setpoint value module 44. The setpoint value module 44 is configured to determine a setpoint value for the reactive current to be provided into the electrical supply grid in the negative phase-sequence system from the characteristic 48 and the actual value for the line side voltage in the negative phase-sequence system 52. The setpoint value module 44 is furthermore configured to determine an asymmetrical grid fault on the basis of the actual values of the line side voltage in the negative phase-sequence system 52. This can take place directly via the characteristic 48, for example.

The setpoint value module 44 is furthermore configured to determine component setpoint values 43 and 46 from the setpoint value determined from the characteristic for the reactive current to be provided into the electrical supply grid in the negative phase-sequence system, via which the reactive power output of the rotor-side converter 30 and the line-side converter 32, respectively, can be controlled. For this purpose, a distribution rule is provided in the setpoint value module 44.

The fact that a double feed of the generator 15 takes place and the detected electrical variables 58, 60 are therefore a superimposition of electrical variables of the rotor circuit and the stator circuit needs to be taken into consideration in the conversion by the setpoint value module 44. The setpoint value module 44 is therefore configured to convert stator circuit variables into rotor circuit variables. In particular, the setpoint value module 44 is configured to calculate the component setpoint values 43 and 46 in such a way that, given corresponding actuation of the rotor-side and the line-side converter 30, 32 with these setpoint values, the reactive current to be provided into the electrical supply grid can be provided. The reactive current setpoint value 43 which is based on the rotor circuit is determined in such a way that the reactive current corresponding thereto which is exchanged between the electrical supply grid 22 and the stator 18 via the line 20 and the reactive current which is exchanged between the electrical supply grid 22 and the line-side converter 32 via the line 28 in total correspond to the determined setpoint value for the reactive current to be provided into the electrical supply grid. In order to implement the conversion, one or more further input variables 70 are present at the setpoint value module 44. The further input variables 70 are, for example, a detected speed of the rotor of the generator and/or a detected line frequency. Further parameters required for the conversion, such as the main inductance and leakage inductance of the generator, for example, may be stored in and retrieved by the setpoint value module 44 from the memory device.

In addition to the component setpoint values 43 and 46 which are determined by the setpoint value module 44, the actual values of the input side currents in the positive phase-sequence system and negative phase-sequence system 63 and the actual values of the output side currents in the positive phase-sequence system and the negative phase-sequence system 65, respectively, are present at the current controllers 40 and 42, respectively, as further input variables. The current controllers 40, 42 are configured to provide setpoint values as input variables for the subsequent step of pulse width modulation for the modules 36 and 38, respectively, on the basis of these variables.

Figure 2:
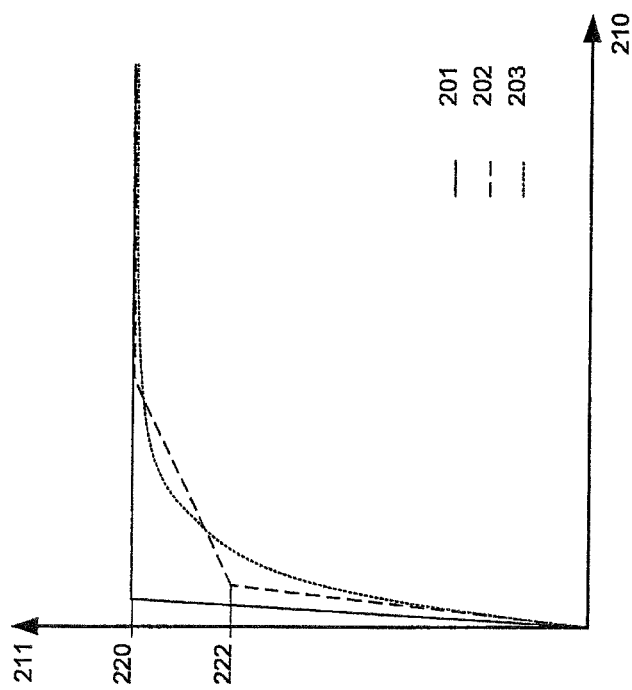
FIG. 2 shows three variants for the distribution of the reactive current setpoint value.

FIG. 2 shows three variants for the distribution of the reactive current setpoint value to be fed into the electrical supply grid into the reactive current components to be provided via the rotor-side converter and via the line-side converter. In order to simplify the substantive matter, it is assumed in FIG. 2 that the variables plotted against one another take into consideration the relationship between the rotor and stator variables.

FIG. 2 shows three exemplary profiles 201, 202, 203 for the setpoint values of the reactive current components to be provided by the rotor-side and the line-side converter, 211 and 210, respectively, in the negative phase-sequence system, which are plotted against one another. In the variant 201 illustrated by a continuous line, the reactive current component of the rotor-side converter 211 in the negative phase-sequence system is increased without any notable or with a low reactive current contribution from the line-side converter 210 up to a maximum value 220 depending on the reactive current to be fed into the electrical supply grid, as determined corresponding to the characteristic. If, above maximum value 220, additional reactive power is required to be fed into the electrical supply grid, the reactive current component of the rotor-side converter 211 is kept constant at the maximum value 220 and while only the setpoint value for the line-side converter 210 is increased.

The variant 202 illustrated by the dashed line has a threshold value 222 for the reactive current component of the rotor-side converter 211. Until the threshold value 222 is reached, there is only a slight increase in the reactive current component of the line-side converter 210. If the setpoint value for the reactive current to be fed into the electrical supply grid exceeds the threshold value 222, both the setpoint value components for the rotor-side converter 211 and for the line-side converter 210 are increased proportionally until a maximum value 220 for the reactive current component provided on the rotor side is reached. When the rotor-side reactive current component reaches the maximum value 220, only the setpoint value component for the line-side converter 210 is increased if additional reactive power is required to be fed into the electrical supply grid.

A third variant 203, which is illustrated by the dotted line in FIG. 2, shows a continuous increase in the reactive current component 210 generated by the line-side converter and the reactive current component of the rotor-side converter 211.

As can be seen in variant 203, the reactive current component of the rotor-side converter 211 is initially increased to a greater extent than the reactive current component of the line-side converter 210. If a higher reactive power is required to be fed into the electrical supply grid, primarily the setpoint value for the line-side converter 210 is increased, while the setpoint value for the rotor-side converter 211 is only increased slightly while it asymptotically approaches the maximum value 220.

In principle, other distribution rules than the variants shown in FIG. 2 are conceivable. In the case of a different distribution rule which would subject the line-side converter to the same level or a greater level of loading than in the previous variants, however, adaptations in respect of the configuration of the converter system, for example in respect of the configuration of the line choke of the line-side converter, may be necessary, causing additional costs.

It is understood that the foregoing description is that of the preferred embodiments of the invention and that various changes and modifications may be made thereto without departing from the spirit and scope of the invention as defined in the appended claims.

LIST OF REFERENCE NUMERALS

10 Wind turbine
12 Rotor
14 Drive train
15 Doubly-fed induction generator
16 Rotor of the generator
18 Stator of the generator
20 Three-phase line
22 Electrical supply grid
24 Three-phase line
26 converter system
27 Controller
28 Three-phase line
30 Rotor-side converter
32 Line-side converter
34 DC link
36 Modulation
38 Modulation
40 Current controller
42 Current controller
44 Setpoint value module
43 Setpoint value for the reactive current component to be provided by the rotor-side converter
46 Setpoint value for the reactive current component to be provided by the line-side converter
48 Characteristic
52 Actual value of the line side voltage in the negative phase-sequence system
54 Actual value of the line side current in the negative phase-sequence system
56 Transformation module
58 Voltages measured on the line side
60 Currents measured on the line side
62 Currents measured on the input side
63 Actual values of the input side currents in the positive phase-sequence system and negative phase-sequence system
64 Currents measured on the output side
65 Actual values of the output side currents in the positive phase-sequence system and negative phase-sequence system
70 Further input variables

What is claimed is:

1. A method for controlling a wind turbine connected to a three-phase electrical supply grid during an asymmetrical grid fault, wherein the wind turbine includes a doubly-fed induction generator having a rotor connected to the electrical supply grid via a converter system and having a stator connected to the electrical supply grid, the converters system including a rotor-side converter, a line-side converter and a controller having a characteristic specifying, for an actual value of a line voltage in a negative phase-sequence system, a setpoint value for a reactive current to be fed into the three-phase electrical supply grid in the negative phase-sequence system, the method comprising the steps of:
   measuring the actual values of the line voltage in at least two phases;
   transforming the measured actual values of the line voltage into an actual value of the line voltage in the negative phase-sequence system;
   determining a setpoint value for a reactive current to be fed into the electrical supply grid in the negative phase-sequence system on the basis of the characteristic and the actual value of the line voltage in the negative phase-sequence system;
   distributing the determined setpoint value for the reactive current to be fed into the electrical supply grid in the negative phase-sequence system among the rotor-side converter and the line-side converter by determining a setpoint value for a reactive current component to be provided by the rotor-side converter and a setpoint value for a reactive current component to be provided by the line-side converter in accordance with a distribution rule provided in the controller; and,
   driving the rotor-side converter and the line-side converter for feeding in reactive current corresponding to the distributed setpoint values.

2. The method of claim 1, wherein the setpoint value for the reactive current component to be provided by the rotor-side converter is limited to a predefined maximum value.

3. The method of claim 2, wherein, in the event that the predefined maximum value for the rotor-side converter is exceeded by the setpoint value for the reactive current to be fed into the electrical supply grid in the negative phase-sequence system, the difference between the setpoint value for the reactive current to be fed into the electrical supply grid in the negative phase-sequence system and the setpoint value for the reactive current component to be provided by the rotor-side converter is preset to the line-side converter as setpoint value for the reactive current component to be provided by the line-side converter.

4. The method of claim 2, wherein, in the case that the setpoint value for the reactive current to be fed in in the negative phase-sequence system is below the maximum value for the reactive current component to be provided by the rotor-side converter, a setpoint value component which is lower than the setpoint value for the reactive current component to be provided by the rotor-side converter is preset for the line-side converter.

5. The method of claim 1, wherein an actual value of an electrical rotor variable is detected.

6. The method of claim 5, wherein the detected actual value for the electrical rotor variable is compared with a predefined threshold value for the electrical rotor variable, and when the actual value of the electrical rotor variable is determined as being greater than the predefined threshold value for the electrical rotor variable, the distribution of the setpoint value for the reactive current to be fed into the electrical supply grid in the negative phase-sequence system is executed in such a way that the setpoint value for the reactive current component to be provided by the rotor-side converter is above the predefined threshold value increased to a lesser extent than below the predefined threshold value.

7. The method of claim 1, wherein the distribution rule is preset depending on the electrical rotor variable.

8. The method of claim 7, wherein the distribution rule includes a mathematical function.

9. The method of claim 8, wherein the distribution rule is configured to asymptotically drive the setpoint value component for the rotor-side converter toward the maximum value depending on the electrical rotor variable.

10. The method of claim 1, wherein the distribution rule includes a set of characteristic curves.

11. The method of claim 1, wherein the electrical rotor variable is a rotor current.

12. The method of claim 1, wherein the electrical rotor variable is a rotor voltage.

13. A wind turbine for feeding electricity into a three-phase electrical supply grid, the wind turbine comprising:
- a converter system;
- a doubly-fed induction generator having a rotor connected to the electrical supply grid via said converter system;
- said converter system including a rotor-side converter, a line-side converter and a controller;
- said controller having a characteristic specifying, for an actual value of a line voltage in a negative phase-sequence system, a setpoint value for a reactive current to be fed into the three-phase electrical supply grid in the negative phase-sequence system;
- the wind turbine further comprising a measuring device configured to detect actual values of the line voltage of at least two phases of the electrical supply grid and to provide said actual values to said controller as input variables;
- said controller including:
- a transformation module, which is configured to transform the provided actual values of the line voltage into an actual value of the line voltage in the negative phase-sequence system;
- a setpoint value module configured to determine a setpoint value for a reactive current to be fed into the electrical supply grid in the negative phase-sequence system on the basis of the provided characteristic in response to the actual value of the line voltage in the negative phase-sequence system, and said setpoint value module being further configured to determine a setpoint value for a reactive current component to be provided by the rotor-side converter and a setpoint value for a reactive current component to be provided by the line-side converter in response to the setpoint value of the reactive current to be fed into the electrical supply grid in the negative phase-sequence system in dependence on a provided distribution rule; and,
- current controllers for the rotor-side converter and the line-side converter, respectively, whereat corresponding ones of setpoint values for the reactive current component to be fed in by the respective converters is present and which current controllers are configured to drive the rotor-side and the line-side converter for feeding in a corresponding reactive current.

14. The wind turbine of claim 13, which is suitable for operation in accordance with a method comprising the steps of:
- measuring the actual values of the line voltage in at least two phases;
- transforming the measured actual values of the line voltage into an actual value of the line voltage in the negative phase-sequence system;
- determining a setpoint value for a reactive current to be fed into the electrical supply grid in the negative phase-sequence system on the basis of the characteristic and the actual value of the line voltage in the negative phase-sequence system;
- distributing the determined setpoint value for the reactive current to be fed into the electrical supply grid in the negative phase-sequence system among the rotor-side converter and the line-side converter by determining a setpoint value for a reactive current component to be provided by the rotor-side converter and a setpoint value for a reactive current component to be provided by the line-side converter in accordance with a distribution rule provided in the controller; and,
- driving the rotor-side converter and the line-side converter for feeding in reactive current corresponding to the distributed setpoint values.

* * * * *